(12) United States Patent
Farnaam

(10) Patent No.: US 10,118,549 B2
(45) Date of Patent: Nov. 6, 2018

(54) VEHICLE REVERSE GEAR SMART-ALERT DEVICE

(71) Applicant: Kambiz Farnaam, Danville, CA (US)

(72) Inventor: Kambiz Farnaam, Danville, CA (US)

( * ) Notice: Subject to any disclaimer, the term of this patent is extended or adjusted under 35 U.S.C. 154(b) by 0 days.

(21) Appl. No.: 15/836,879

(22) Filed: Dec. 10, 2017

(65) Prior Publication Data

US 2018/0162270 A1   Jun. 14, 2018

Related U.S. Application Data

(60) Provisional application No. 62/498,028, filed on Dec. 12, 2016.

(51) Int. Cl.
| | | |
|---|---|---|
| *B60Q 1/22* | (2006.01) |
| *B60Q 5/00* | (2006.01) |
| *B60Q 1/26* | (2006.01) |
| *B60Q 1/34* | (2006.01) |
| *B60Q 1/40* | (2006.01) |
| *B60Q 1/56* | (2006.01) |
| *B60Q 1/36* | (2006.01) |
| *B60Q 1/50* | (2006.01) |

(52) U.S. Cl.
CPC ............... *B60Q 5/005* (2013.01); *B60Q 1/22* (2013.01); *B60Q 1/2657* (2013.01); *B60Q 1/2692* (2013.01); *B60Q 1/346* (2013.01); *B60Q 1/36* (2013.01); *B60Q 1/40* (2013.01); *B60Q 1/50* (2013.01); *B60Q 1/56* (2013.01); *B60Q 5/006* (2013.01); *B60Q 2900/10* (2013.01); *B60Y 2306/11* (2013.01); *B60Y 2400/3017* (2013.01)

(58) Field of Classification Search
CPC .... B60Q 5/005; B60Q 1/2657; B60Q 1/2692; B60Q 1/346; B60Q 1/36; B60Q 1/40; B60Q 1/56; B60Y 2306/11; B60Y 2400/3017

See application file for complete search history.

(56) References Cited

U.S. PATENT DOCUMENTS

| | | | | |
|---|---|---|---|---|
| 3,569,927 A | * | 3/1971 | Guyton ................... | B60Q 1/22 |
| | | | | 200/61.39 |
| 5,281,948 A | * | 1/1994 | Estrada ................... | B60Q 1/50 |
| | | | | 340/433 |
| 6,084,507 A | * | 7/2000 | Butler ..................... | B60Q 1/32 |
| | | | | 340/437 |

(Continued)

*Primary Examiner* — Joseph H Feild
*Assistant Examiner* — Rufus C Point
(74) *Attorney, Agent, or Firm* — Barry Choobin; Patent 360

(57) ABSTRACT

The various embodiments herein provide a reverse gear sensor and alert device for a vehicle comprising an electronic hub, a motor and a tail. The electronic hub comprises a control electronics circuitry (CEC), an audible buzzer, and an ultrasonic buzzer. The electronic hub is installed over a base frame attached to a rear body of the vehicle and is connected with a power source. The tail is attached to the electronic hub through the motor. The tail comprises a plurality of illumination members fixed on an outer surface of the tail and are powered through the motor. The power supply allows a flow of current to the motor on detecting a reverse gear activation in the vehicle. The current flow energizes the motor leading to a protrusion of the tail out of the vehicle. The plurality of illumination members, the audible buzzer, and the ultrasonic buzzer are activated on activation of the reverse gear.

16 Claims, 2 Drawing Sheets

(56) References Cited

U.S. PATENT DOCUMENTS

| | | | | |
|---|---|---|---|---|
| 6,404,334 B1* | 6/2002 | Chao | | B60Q 1/22 340/464 |
| 6,720,868 B2* | 4/2004 | Flick | | B60Q 1/22 340/435 |
| 7,306,345 B2* | 12/2007 | Golle | | G09F 13/22 362/540 |
| 7,868,747 B2* | 1/2011 | Tang | | B60R 11/04 340/435 |
| 8,688,365 B2* | 4/2014 | Karandikar | | G08G 1/165 340/435 |
| 9,329,268 B2* | 5/2016 | Luft | | B60R 11/04 |
| 9,916,779 B1* | 3/2018 | Parnell | | G09F 13/0413 |
| 2002/0011928 A1* | 1/2002 | Williams | | B60Q 9/006 340/436 |
| 2002/0175830 A1* | 11/2002 | Hudson | | G08G 1/0955 340/907 |
| 2002/0180597 A1* | 12/2002 | Flick | | B60Q 1/22 340/436 |
| 2005/0057943 A1* | 3/2005 | Mako | | G02B 6/0008 362/555 |
| 2008/0023247 A1* | 1/2008 | Hall | | B60K 28/14 180/274 |
| 2009/0000166 A1* | 1/2009 | Gallet | | G09F 13/16 40/582 |
| 2011/0010974 A1* | 1/2011 | White | | F21V 21/06 40/606.02 |
| 2012/0092185 A1* | 4/2012 | Hayashi | | B60Q 5/008 340/904 |
| 2012/0111261 A1* | 5/2012 | Schmitt | | B60P 1/43 116/28 R |
| 2013/0057398 A1* | 3/2013 | Wen | | B60Q 1/0023 340/435 |
| 2014/0098231 A1* | 4/2014 | Buley | | B60R 1/00 348/148 |
| 2014/0111323 A1* | 4/2014 | Strout | | B60Q 1/268 340/425.5 |
| 2014/0184068 A1* | 7/2014 | Kwon | | B60Q 1/2603 315/80 |
| 2017/0080785 A1* | 3/2017 | Azarko | | G06F 3/0416 |
| 2017/0200197 A1* | 7/2017 | Brubaker | | G09F 9/35 |
| 2017/0210284 A1* | 7/2017 | Donan | | B60Q 1/2692 |
| 2017/0244902 A1* | 8/2017 | DiMenichi | | H04N 5/2251 |
| 2017/0299141 A1* | 10/2017 | Hansen | | B60Q 1/2615 |

* cited by examiner

VEHICLE REVERSE GEAR SMART-ALERT DEVICE

BACKGROUND

Technical Field of Invention

The embodiments herein generally relate to a vehicular accessory and particularly relate to a smart alert device for vehicle reversing. The embodiments herein more particularly relate to a device for sending a proximity alert to nearby vehicles, pedestrians, and pets, during a revering of a vehicle.

Description of Related Art

The vehicles in present day context require a plurality of sensors during driving due to traffic conditions, increase in vehicle numbers and erratic driving. Especially for reversing, the sensors like back-up beeper and parking sensors are required. A back-up beeper also known as back-up alarm, backup beeper, backup buzzer, or vehicle motion alarm, is a device intended to warn passers-by of a vehicle moving in reverse. They typically produce 1000-2000 Hz tone beeps at 97-112 decibels, considerably higher than the long-term hearing loss limit of 80 decibels. The parking sensors are proximity sensors for road vehicles designed to alert the driver to obstacles while parking. These systems use either electromagnetic or ultrasonic sensors.

Although, efficient and modular techniques are still under development to present visual alerts, audible buzzers, and ultrasonic buzzers for the driver, pedestrians, pets, and/or for nearby vehicles. One of the such prior arts discloses a reverse mode detection system which can be used by drivers to gauge the distance from the rear of the vehicle to an object or an array of objects, and to provide an optional combination of a soft alert or a distance reading which the user can optionally use to assist in reverse movements of a vehicle.

Although, the prior arts provide only a linear or straight-line detection of an obstacle or an object but fail to provide angular or multi-directional detection, that leads to accidents during lateral movement of the vehicles. Also, the sensor modules have to be embedded in a body frame of the vehicles which requires complex fixture units and connection to a battery panel or the vehicle. Further, the prior arts also fail to efficiently alert other vehicle drivers and pedestrians including children and pets.

In the view of foregoing, there is a need for a modular reverse gear sensor device with visual alert, audible buzzer, and ultrasonic buzzer. Also, there is a need for a reverse gear sensor and alert device with enhancement for viewing an oncoming object or vehicle in lateral directions during a reversing of the vehicle.

The above-mentioned shortcomings, disadvantages and problems are addressed herein, as detailed below.

SUMMARY OF THE INVENTION

The primary object of the embodiments herein is to provide a modular reverse gear sensor device with visual alert device.

Another object of the embodiment herein is to provide a reverse gear sensor and alert device with enhancement for viewing an oncoming object or vehicle in lateral directions during a reversing of the vehicle.

The various embodiments herein provide a reverse gear sensor and alert device for a vehicle comprising an electronic hub, a motor and a tail. The electronic hub comprises a control electronics circuitry (CEC), an audible buzzer, and an ultrasonic buzzer. The electronic hub is installed over a base frame attached to a rear body of the vehicle and is connected with a power source. The motor is connected to the electronic hub and a power source. The tail is attached to the electronic hub through the motor and wires. The tail comprises a plurality of illumination members fixed on an outer surface of the tail and are powered through the control electronics circuitry. The power supply allows a flow of current to the motor on detecting a reverse gear activation in the vehicle. The current flow energizes the motor leading to a protrusion of the tail out of a body of the vehicle. The plurality of illumination members, the audible buzzer, and the ultrasonic buzzer are activated on activation of the reverse gear.

According to one embodiment of the present invention, the tail is protruded radially outwards from the body of the vehicle and retracted within the body frame of the device after deactivation of the reverse gear.

According to one embodiment of the present invention, the tail comprises a lateral sensor fixed at a toe-end. The lateral sensor is activated after the protrusion of the tail and senses a lateral movement of the vehicles with respect to the vehicle installed with the device.

According to one embodiment of the present invention, the lateral sensor is capable of capturing images and control a frequency and an amplitude of the audible and the ultrasonic buzzers on the basis of a movement of the vehicles towards the vehicle installed with device.

According to one embodiment of the present invention, the power source is a battery panel installed in the vehicle.

According to one embodiment of the present invention, the power source is an independent package of a solar panel and rechargeable battery bank. The power source is installed on an outer surface of the base frame of the device.

According to one embodiment of the present invention, the electronic hub is connected to an electronic control unit (ECU) for real time monitoring of the relative motion of oncoming vehicles and diagnosing a functional health of the device.

According to one embodiment of the present invention, a light intensity and strobe frequency of the plurality of illumination panels is controlled by the lateral sensor. The light intensity and the strobe frequency can change on detection of an object moving closer to the vehicle body.

According to one embodiment of the present invention, the electronic hub comprises a doppler sensor for detection of distance of a moving and stagnant object with respect to a reversing vehicle.

According to one embodiment of the present invention, the tail is protruded in an angular direction varying from 15°-165° with respect to the rear surface of the vehicle in a vertical as well as a horizontal axis.

These and other aspects of the embodiments herein will be better appreciated and understood when considered in conjunction with the following description and the accompanied drawings. It should be understood, however, that the following descriptions, while indicating a set of embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanied drawings in which.

DETAILED DESCRIPTION OF THE DRAWINGS

In the following detailed description, a reference is made to the accompanied drawings that form a part hereof, and in which the specific embodiments that may be practiced is shown by way of illustration. The embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

Figure 1A:
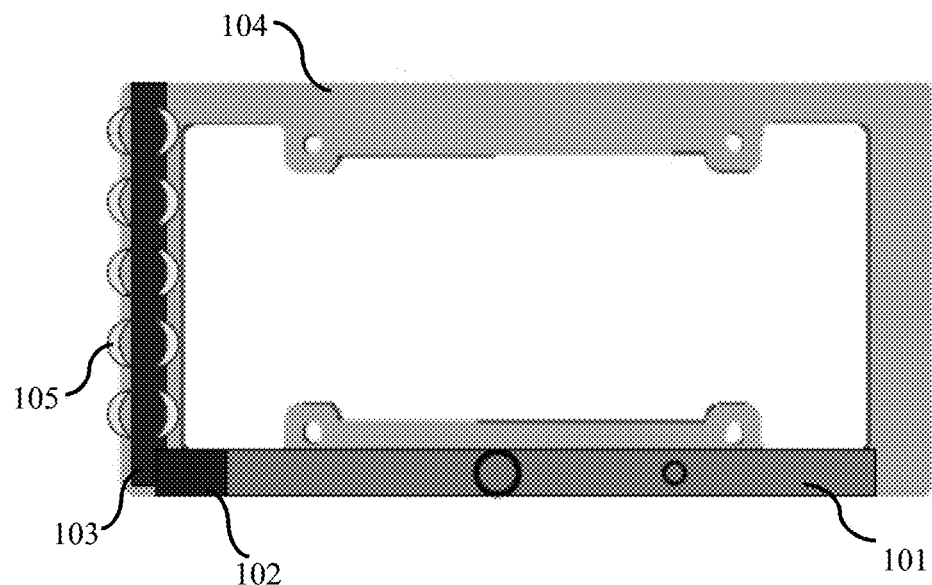
FIGS. 1a and 1b illustrates a front view and a side perspective view of a reverse gear sensor and alert device installed over a license plate of a vehicle in a retracted mode, according to one embodiment herein.
Figure 1B:
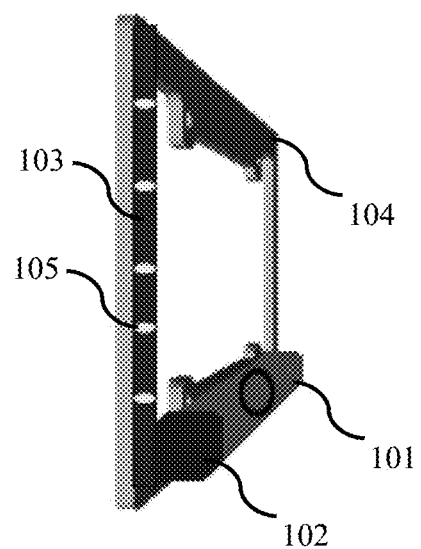

FIGS. 1a and 1b illustrates a front view and a side perspective view of a reverse gear sensor and alert device installed over a license plate of a vehicle in a retracted mode, according to one embodiment herein. With respect to FIGS. 1a and 1b, a reverse gear sensor and alert device for a vehicle comprising an electronic hub 101, a motor 102, and a tail 103. The electronic hub 101 comprises a control electronics circuitry (CEC), an audible buzzer, and an ultrasonic buzzer. The electronic hub 101 is installed over a base frame 104 attached to a rear body of the vehicle and is connected with a power source. The motor 102 is connected to the electronic hub 101 and a power source. The tail 103 is attached to the electronic hub 101 through the motor 102 and wires. The tail 103 comprises a plurality of illumination members 105 fixed on an outer surface of the tail and are powered by the electronic hub 101 through wires. The power supply allows a flow of current to the motor 102 on sensing a reverse gear activation in the vehicle. The current flow energizes the motor 102 leading to a protrusion of the tail 103 out of a body of the vehicle. The plurality of illumination members, the audible buzzer, and the ultrasonic buzzer are activated on activation of a reverse gear.

Figure 2A:
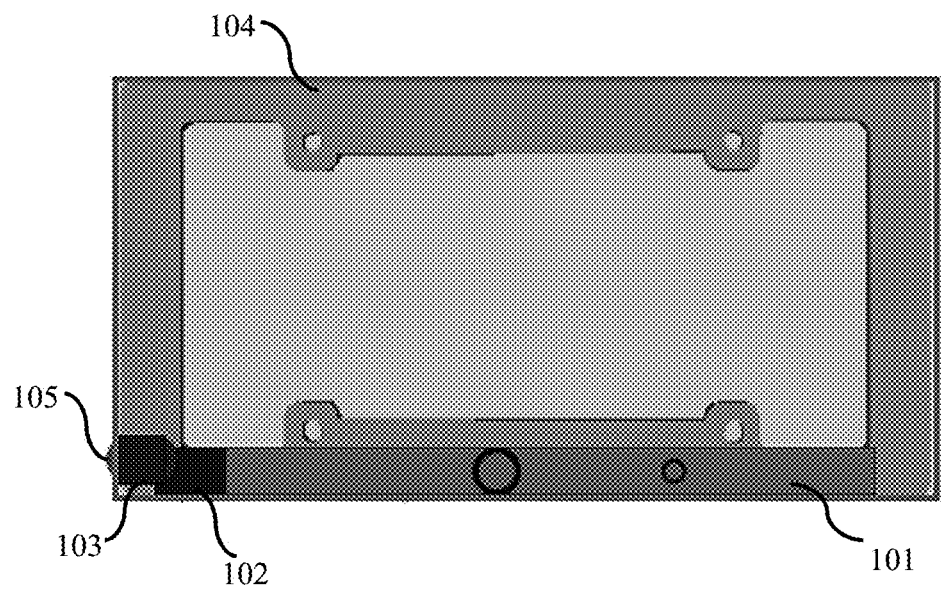
FIGS. 2a and 2b illustrates a front view and a side perspective view of the reverse gear sensor and alert device installed over a license plate of a vehicle in a projected mode, according to one embodiment herein.
Figure 2B:
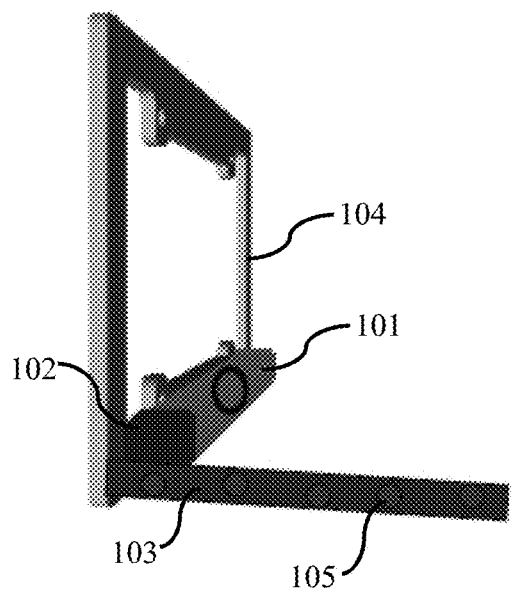

FIGS. 2a and 2b illustrates a front view and a side perspective view of the reverse gear sensor and alert device installed under a license plate of a vehicle in a projected mode, according to one embodiment herein. With respect to FIGS. 2a and 2b, the tail 103 is protruded radially outwards from the body of the vehicle and retracted within the body frame 104 of the device after deactivation of the reverse gear.

According to one embodiment of the present invention, the tail comprises a lateral sensor fixed at a toe-end. The lateral sensor is activated after the protrusion of the tail and senses a lateral movement of the vehicles with respect to the vehicle installed with the device.

According to one embodiment of the present invention, the lateral sensor is capable of capturing images and control a frequency and an amplitude of the audible and ultrasonic buzzers on the basis of a movement of the vehicles towards the vehicle installed with device.

According to one embodiment of the present invention, the power source is a battery panel installed in the vehicle.

According to one embodiment of the present invention, the power source is an independent package of a solar panel and rechargeable battery bank. The power source is installed on an outer surface of the base of the device.

According to one embodiment of the present invention, the electronic hub is connected to an electronic control unit (ECU) for real time monitoring of the relative motion of oncoming vehicles and diagnosing a functional health of the device.

According to one embodiment of the present invention, a light intensity and strobe frequency of the plurality of illumination panels is controlled by the lateral sensor. The light intensity and the strobe frequency can change on detection of an object moving closer to the vehicle body.

According to one embodiment of the present invention, the strobes of light from the plurality of illumination members is visible from a radial distance of at-least 5 m and a lateral distance of at-least 10 m. The sounds from the audible and ultrasonic buzzers have an alert range of 5 m-500 m.

According to one embodiment of the present invention, the device can be attached to the vehicle as an independent and detachable unit and also, the device can be integrated to the vehicle body frame during manufacturing.

The present reverse gear sensor and alert device is modular in nature and can be attached to any vehicle size. Further, the present device has higher visual and sensing coverage in a reverse gear than the conventional sensors as the conventional sensors have only radial coverage while the present device has coverage in radial as well as lateral range.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims.

I claim:

1. A reverse gear sensor and alert device for a vehicle comprising:
    an electronic hub, wherein the electronic hub comprises a control electronics circuitry (CEC), a reverse gear sensor, an audible buzzer, and an ultrasonic buzzer, wherein the electronic hub is installed over a base frame attached to a rear body of the vehicle and is connected with a power source;
    a motor, wherein the motor is connected to the power source; and
    a tail, wherein the tail is attached to the electronic hub through a wired medium, wherein the tail comprises a plurality of illumination members fixed on an outer surface of the tail and are powered through the electronic hub, wherein a lateral sensor captures images and controls a frequency and an amplitude of the audible buzzer and the ultrasonic buzzer on the basis of the proximity of pedestrians and objects to, or movement of the vehicles towards, the vehicle installed with device.

2. The device according to claim 1 wherein, the power source allows a flow of current to the motor on sensing a reverse gear activation through the reverse gear sensor, wherein the current flow energizes the motor leading a protrusion of the tail out of a body of the vehicle, wherein the plurality of illumination members, the audible buzzer, and the ultrasonic buzzer are activated on activation of a reverse gear.

3. The device according to claim 1, wherein the tail is protruded radially outwards from the body of the vehicle and retracted within the body frame of the device after deactivation of the reverse gear.

4. The device according to claim 1, wherein the tail comprises the lateral sensor fixed at a toe-end, wherein the lateral sensor is activated after the protrusion of the tail and senses a lateral movement of the vehicles with respect to the vehicle installed with the device.

5. The device according to claim 1, wherein the power source is a battery panel installed in the vehicle.

6. The device according to claim 1, wherein the power source is an independent package of a solar panel and rechargeable battery bank, wherein the power source is installed on an outer surface of the base frame of the device.

7. The device according to claim 1, wherein the power source is a replaceable battery or battery pack installed in the device.

8. The device according to claim 1, wherein the electronic hub is connected to an electronic control unit (ECU) for real time monitoring of the relative motion of oncoming vehicles and diagnosing a functional health of the device.

9. The device according to claim 1, wherein a light intensity and/or strobe frequency of the plurality of illumination panels is controlled by the lateral sensor, wherein the light intensity and/or the strobe frequency can change on detection of an object moving closer to the vehicle body.

10. The device according to claim 1, wherein the electronic hub comprises a Doppler sensor for detection of distance of a moving and stagnant object with respect to a reversing vehicle.

11. The device according to claim 1, wherein the tail is protruded in an angular direction varying from 15°-165° with respect to the rear surface of the vehicle in a vertical as well as a horizontal axis.

12. The device according to claim 1, wherein the tail is hidden inside the outer body of the vehicle and protrudes out in a straight movement along its length.

13. The device according to claim 1, wherein the audible buzzer and the ultrasonic buzzer are installed on the tail.

14. The device according to claim 1, wherein the Doppler sensor is installed on the tail.

15. The device according to claim 1, wherein the device is installed around the license plate of the vehicle.

16. The device according to claim 1, wherein the frequency of the ultrasonic buzzer is chosen in the range most effective in alerting and forcing away the dogs or other pets.

* * * * *